(12) United States Patent
Hucker et al.

(10) Patent No.: US 8,607,543 B2
(45) Date of Patent: Dec. 17, 2013

(54) MILLIMETRE-SCALE ENGINE

(75) Inventors: Martyn John Hucker, Cleeve (GB); Clyde Warsop, Lydney (GB); Harriet Ann Holden, Brentry (GB)

(73) Assignee: Bae Systems PLC, London (GB)

( * ) Notice: Subject to any disclaimer, the term of this patent is extended or adjusted under 35 U.S.C. 154(b) by 1576 days.

(21) Appl. No.: 11/814,927

(22) PCT Filed: May 9, 2007

(86) PCT No.: PCT/GB2007/050243
§ 371 (c)(1),
(2), (4) Date: Jul. 27, 2007

(87) PCT Pub. No.: WO2007/135455
PCT Pub. Date: Nov. 29, 2007

(65) Prior Publication Data
US 2010/0126140 A1 May 27, 2010

(30) Foreign Application Priority Data

May 19, 2006 (EP) ..................................... 06252626
May 19, 2006 (GB) ................................... 0609961.8

(51) Int. Cl.
*F23C 15/00* (2006.01)

(52) U.S. Cl.
USPC ............................................ 60/39.77; 431/1

(58) Field of Classification Search
USPC ................... 60/39.76, 39.77, 247, 248; 431/1
See application file for complete search history.

(56) References Cited

U.S. PATENT DOCUMENTS

| 3,206,926 | A | 9/1965 | Lockwood |
| 3,456,441 | A | 7/1969 | Grabber |
| 3,462,955 | A | 8/1969 | Lockwood et al. |
| 3,774,398 | A | 11/1973 | Etessam |
| 6,193,501 | B1 | 2/2001 | Masel et al. |
| 6,554,607 | B1 | 4/2003 | Glezer et al. |
| 6,706,320 | B2 * | 3/2004 | Filippou et al. ............... 427/223 |

FOREIGN PATENT DOCUMENTS

| GB | 641472 | 8/1950 |
| GB | 739729 | 11/1955 |
| GB | 921846 | 3/1963 |
| GB | 2 180 299 A | 3/1987 |
| WO | 01/84061 A2 | 11/2001 |
| WO | 03/064023 A1 | 8/2003 |
| WO | WO2004031651 * | 4/2004 |
| WO | 2005/106234 A2 | 11/2005 |

OTHER PUBLICATIONS

United Kingdom Search Report dated Sep. 20, 2006.
European Search Report dated Dec. 4, 2006.

(Continued)

*Primary Examiner* — Andrew Nguyen
(74) *Attorney, Agent, or Firm* — Buchanan Ingersoll & Rooney PC

(57) ABSTRACT

A millimeter-scale pulse jet engine comprises an engine body that defines a combustion chamber, a fuel, an air intake, and an exhaust. The fuel inlet is arranged to inject fuel directly into the combustion chamber. The air intake and the exhaust are in fluid communication with the combustion chamber, and the combustion chamber is configured such that air from the air intake and fuel from the fuel inlet cyclically combust in the combustion chamber to produce exhaust gases.

23 Claims, 8 Drawing Sheets

(56) References Cited

OTHER PUBLICATIONS

Alan H. Epstein, "Millimeter-Scale, MEMS Gas Turbine Engines", Proceedings of ASME Turbo Expo, 2003, Jun. 16-19, 2003, pp. 1-28, Atlanta, Georgia, USA.

Dimitios C. Kyritsis et al., "Mesoscale Power Generation by a Catalytic Combustor Using Electrosprayed Liquid Hydrocarbons", Publisher in Proceedings of the Twenty-Ninth Symposium (International) on Combustion, 2002, pp. 1-21.

Jan Peirs et al., "A Microturbine for Electric Power Generation", Sensors Actuators A, 2004, pp. 86-93, Elsevier B.V.

International Search Report and Form PCT/ISA/220, issued by the European Patent Office in corresponding International Patent Application No. PCT/GB2007/050243, Jul. 19, 2007, Rijswijk, NL.

\* cited by examiner

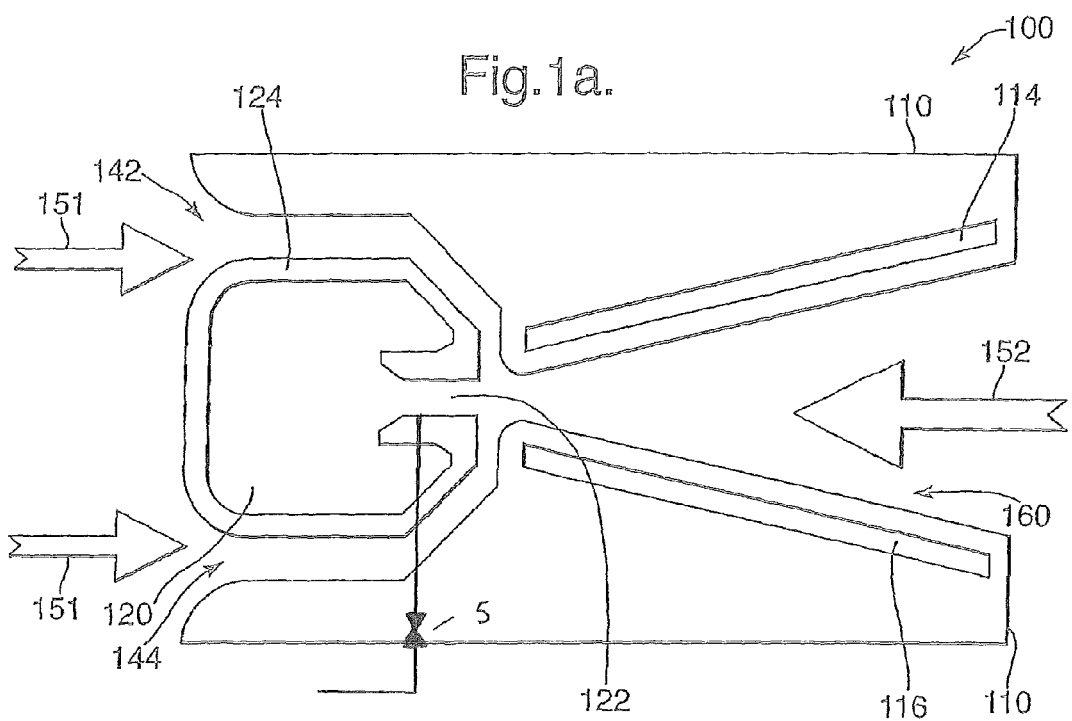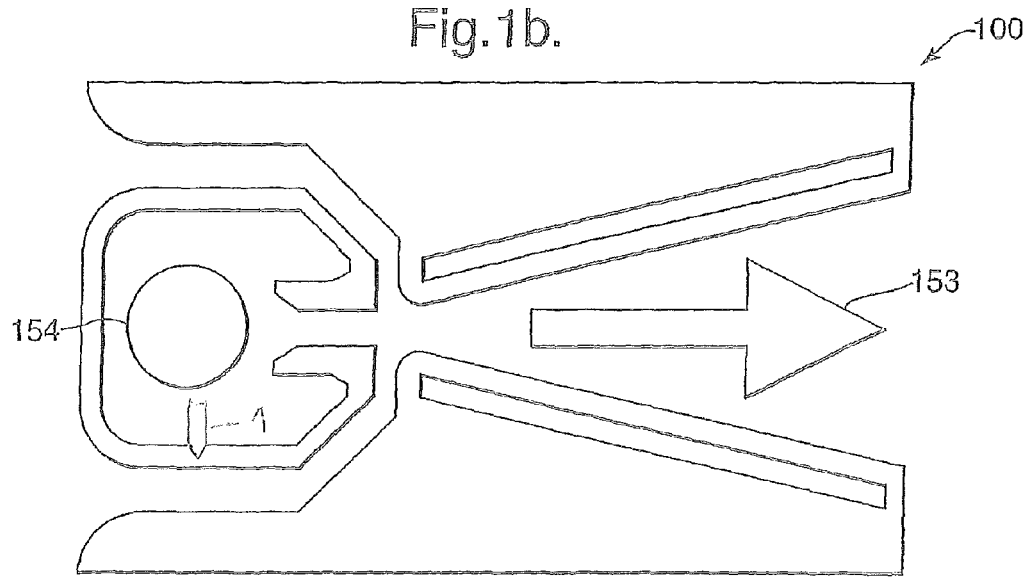

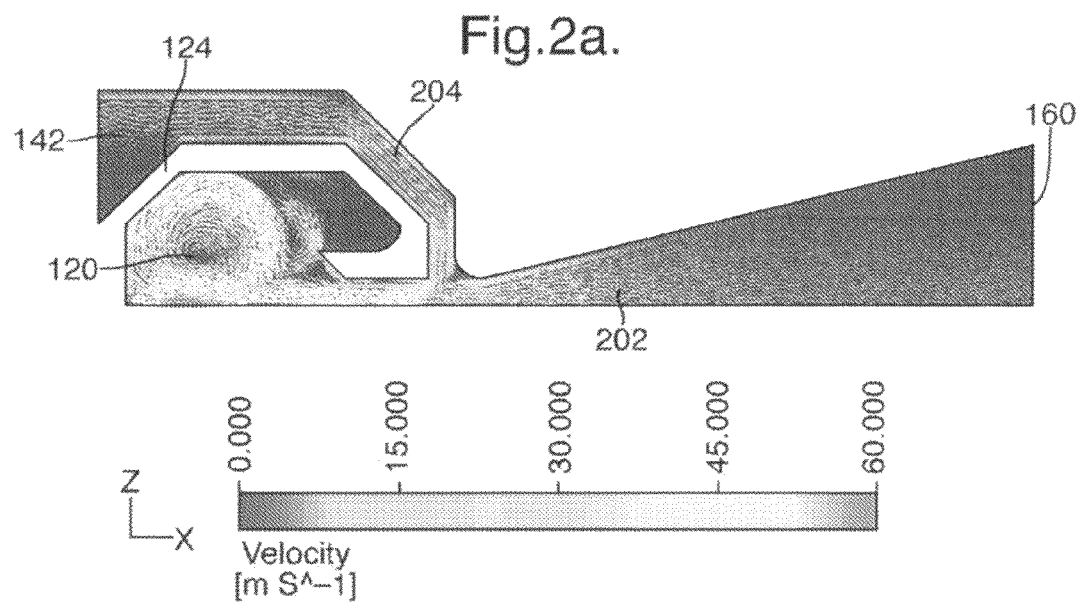
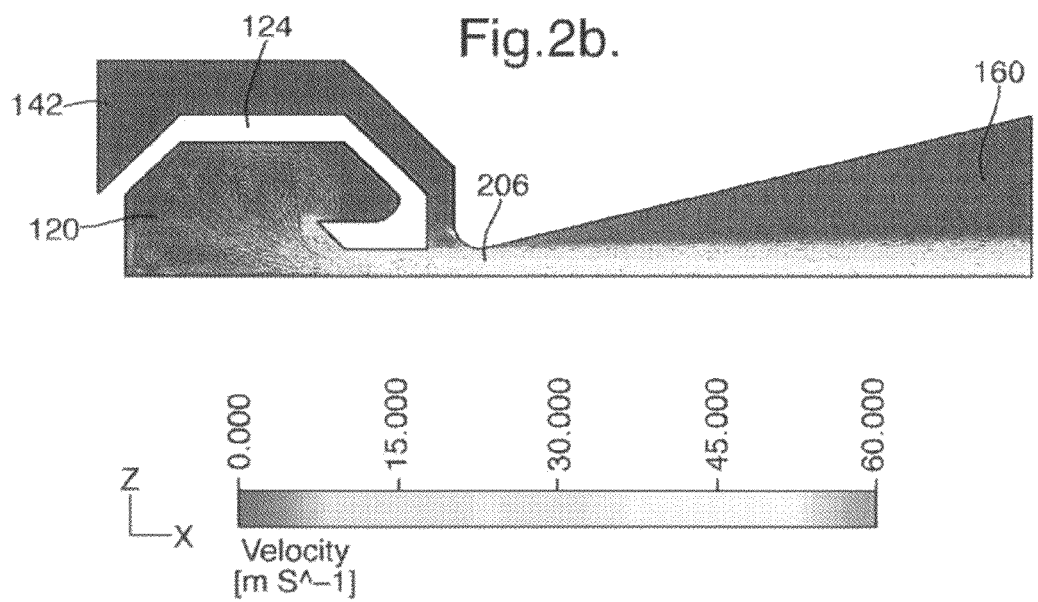

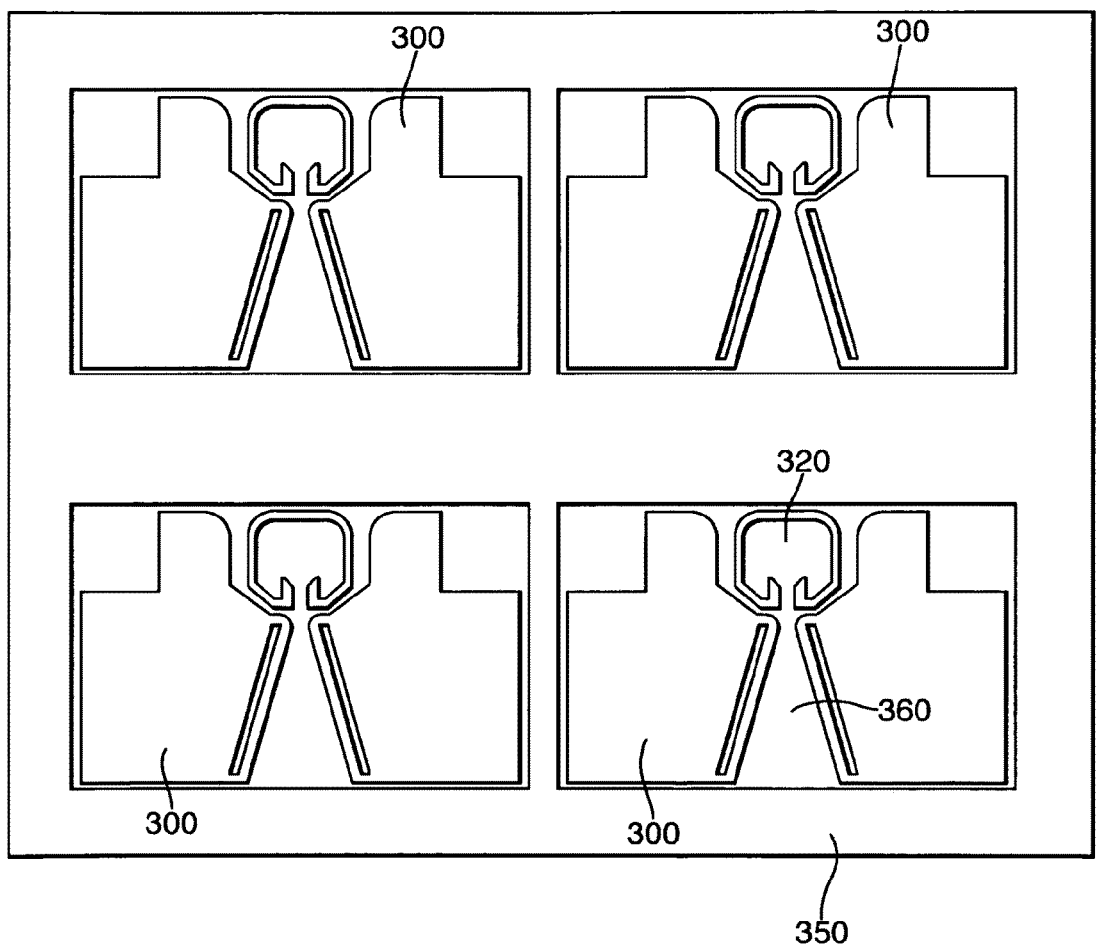

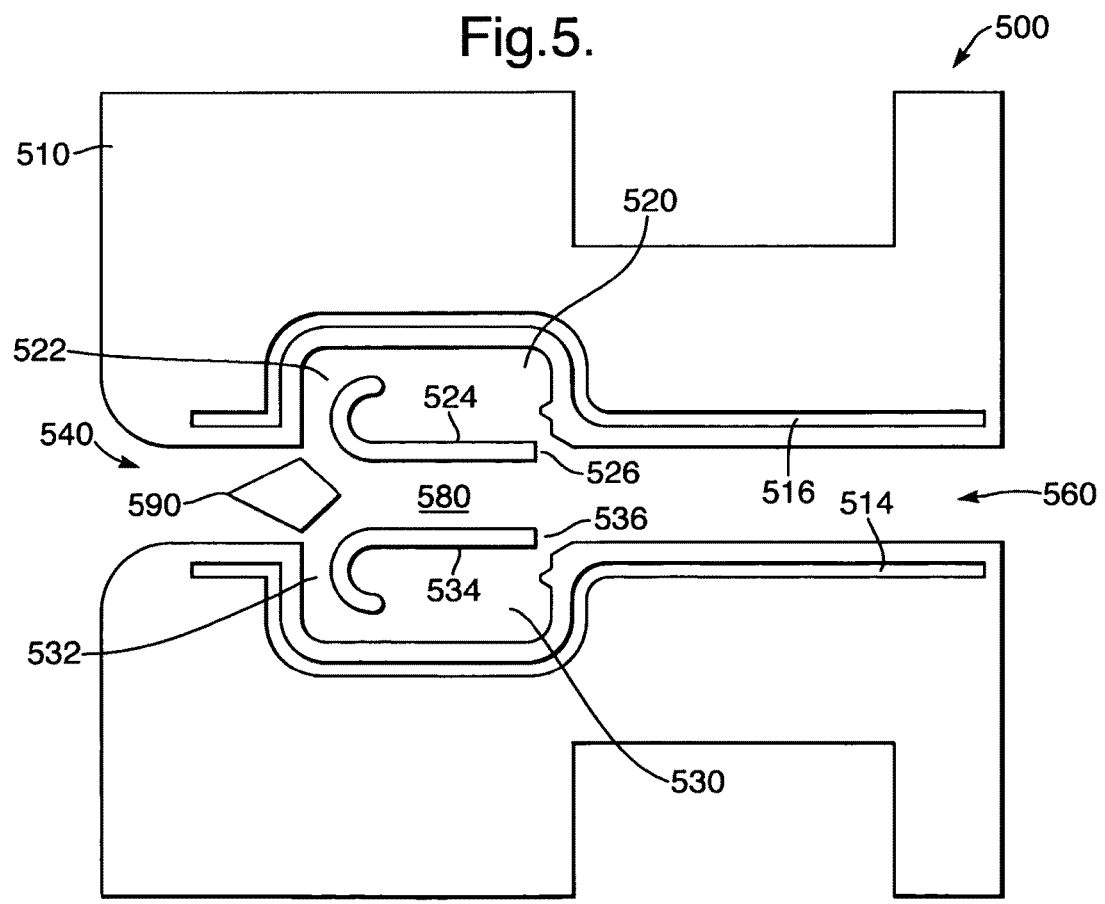

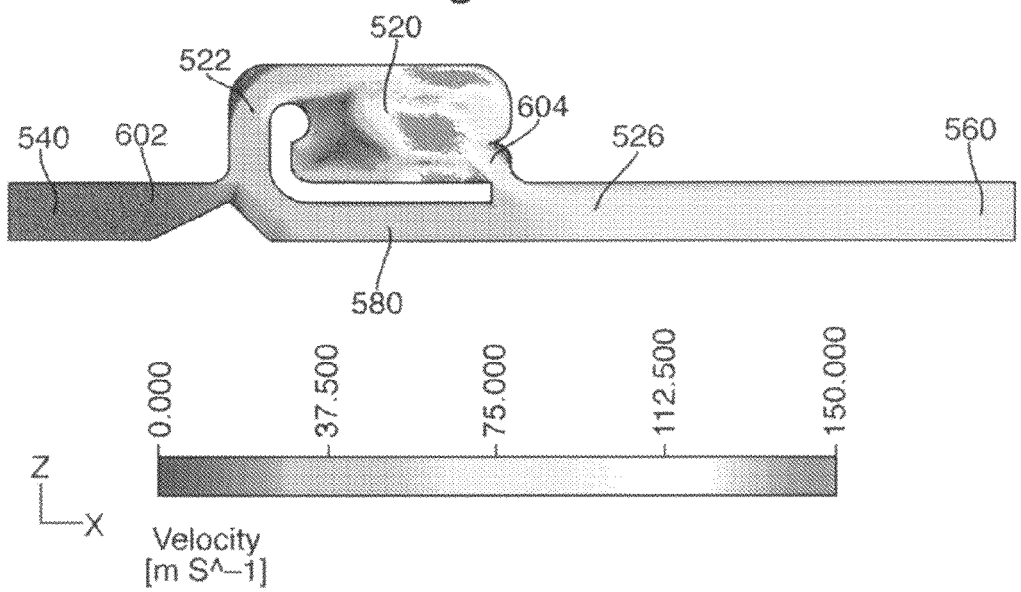
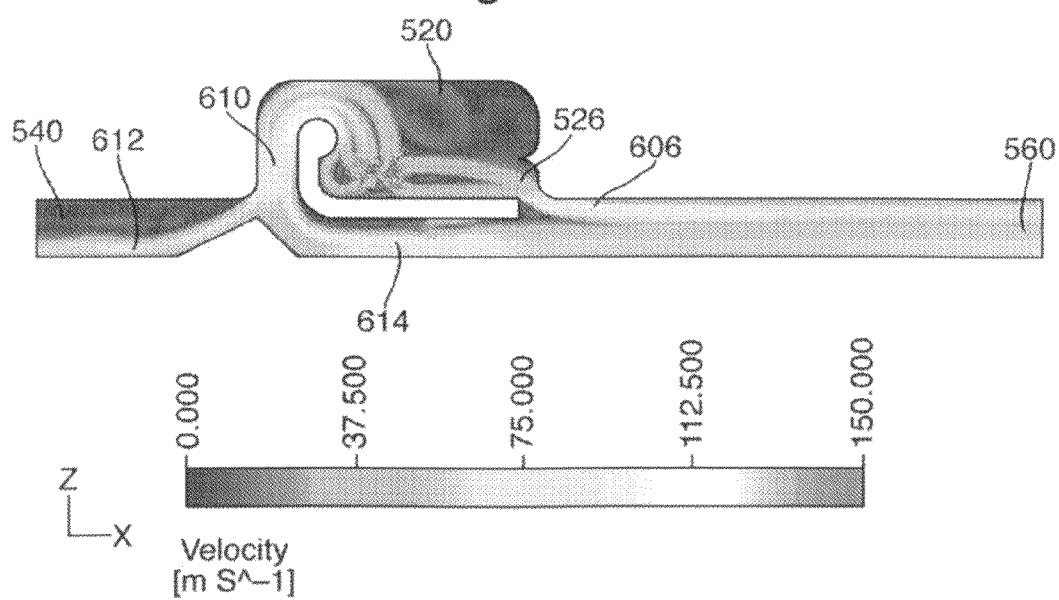

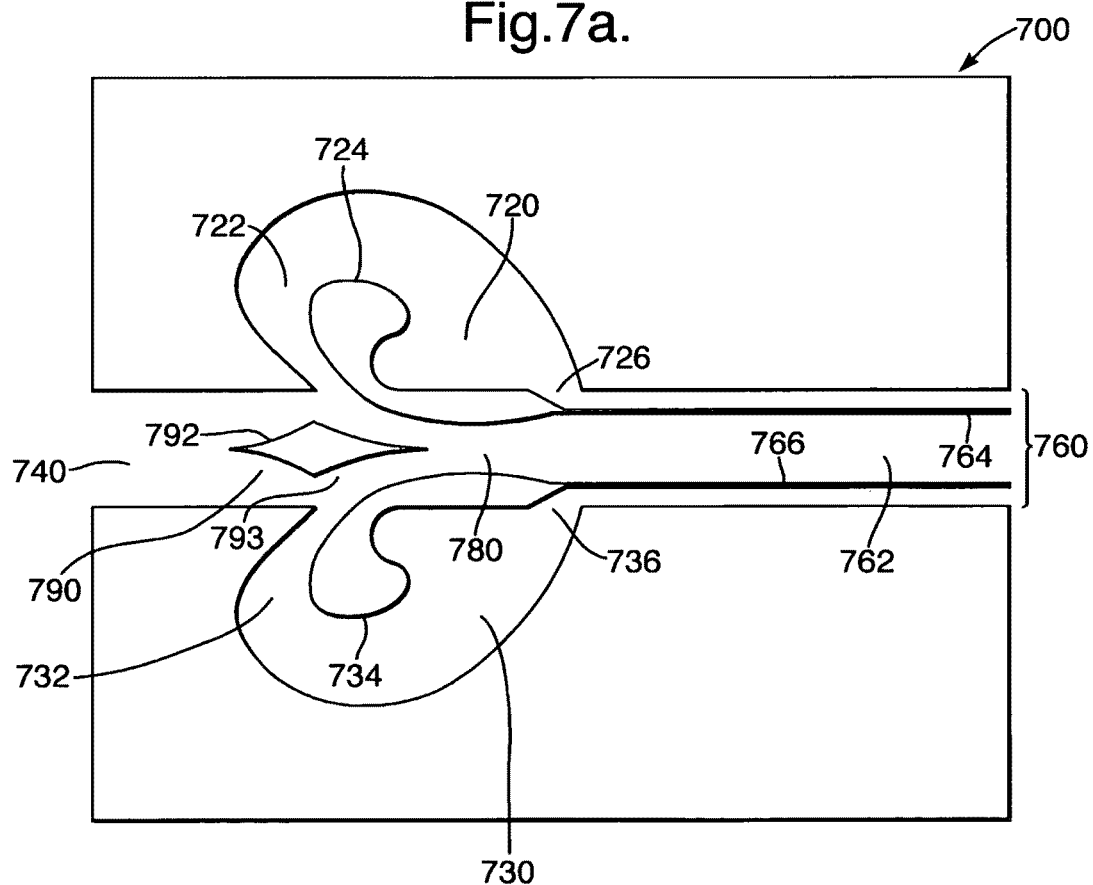

MILLIMETRE-SCALE ENGINE

This invention relates to millimeter-scale engines. More particularly, this invention relates to millimeter-scale pulse jet engines. Such engines can be constructed using micromachining technology, such as chemical or plasma etching, and are of size measurable on the millimeter scale.

Millimeter-scale gas turbine engines are known, for example from the document "Millimeter-Scale, MEMS Gas Turbine Engines", by Alan H Epstein, published in Proceedings of ASME Turbo Expo 2003 Power for Land, Sea, and Air (Jun. 16-19 2003). Epstein discloses a number of microfabricated gas turbine engines and methods of manufacture thereof. These engines, of dimensions 1-10,000 µm, are expected to find application in the propulsion of aircraft or other vehicles, and also in the field of compact power supply: the energy density of hydrocarbon fuels, when burned in air, is some twenty to thirty times that of state-of-the-art lithium-based batteries, and so microfabricated gas turbine engines, when adapted to function as electrical power generators, could compete with conventional batteries.

Unfortunately, these engines are remarkably complex. They contain a number of moving parts, including rotors that must rotate freely with clearances of the order of four microns. The fabrication process is also complex, requiring, even in a much-simplified example disclosed by Epstein, seventeen manufacturing steps. They must be fabricated using stacks of precisely aligned wafers. Moreover, it has been found that any moving parts present problems in millimeter-scale combustion engines because of the danger of incomplete combustion leading to carbon deposits. Such deposits represent a high-risk failure mode given the micron-scale clearances between moving parts.

Epstein makes fleeting reference to the possibility of microfabricating other types of engines, such as a ramjet or pulse detonation engine, without indicating the complexities involved in such engines. Ramjet engines function only at extremely high air speeds, and are therefore impractical for use as a compact power source or battery replacement. Pulse detonation engines require precise timing cycles, and careful control of the fuel-to-air ratios within them, in order for detonation to occur. Micro-mechanical valves combined with precise control mechanisms are needed to accomplish this timing.

Pulse jet engines have been known, on the macro-scale, for over a century. Such known pulse jet engines at their simplest comprise a tube having a valve at one end. These engines operate on a continuous resonant cycle. At the start of the cycle, in the ignition phase, the valve is closed and a fuel/air mixture is ignited in the tube. The fuel/air mixture continues to combust throughout the combustion phase, expanding as it combusts and creating an overpressure in the tube. This overpressure ensures the valve remains shut and forces exhaust gases out of the tube through the exhaust, at the opposite end of the tube to the valve. Over-expansion of the gases within the tube after the fuel has combusted leads to a reduced pressure within the tube. The reduced pressure causes the valve to open, and thus a fresh fuel air mixture is admitted through the valve. During this intake phase some hot exhaust gases, still in the exhaust end of the tube, will be sucked back towards the valve end of the tube. The suction of fuel/air and exhaust gases back into the tube leads to compression at one end of the tube. After compression, the ignition phase is initiated again, once a sufficient pressure of fuel/air mixture is present at a sufficiently high temperature.

Valveless pulse jet engines are also known—for example, the Lockwood-Hiller engine disclosed by U.S. Pat. No. 3,462,955. More recently, an ultrasonic pulse jet engine has been disclosed in International Patent Application No. PCT/GB2005/001681, Publication No. WO2005/106234, although unfortunately no description is given of how such an engine could be manufactured. The pulse jet engine disclosed therein requires pre-mixing of fuel with air in an external carburettor, and operates at a frequency in the range 20 kHz to 30 kHz. Such frequencies are outside the range to which human ears are sensitive, and the engine disclosed by WO2005/106234 has the advantage that the noise it generates cannot be heard by humans. Engines disclosed by WO2005/106234 are approximately conical in shape, or, in one embodiment disclosed therein, in the form of an annulus having a cross section that decreases to an apex at one end.

There thus exists a need for a millimeter-scale engine that is simple to fabricate and reliable, and it is accordingly an object of the present invention to provide such an engine. It is a further object of the present invention to provide a millimeter-scale engine that overcomes, or at least mitigates, some of the above mentioned problems.

Against this background, the present invention provides in one aspect a millimeter-scale pulse jet engine comprising an engine body; which engine body defines: a combustion chamber; a fuel inlet arranged to inject fuel directly into the combustion chamber; an air intake; and an exhaust; wherein the air intake and the exhaust are in fluid communication with the combustion chamber; and the combustion chamber is configured such that air from the air intake and fuel from the fuel inlet cyclically combust in the combustion chamber to produce exhaust gases. Thus, engines provided by the present invention are millimeter-scale, by which it is meant that the dimensions of such engines are of the order of a few millimeters, or a few tens of millimeters. For example, one embodiment, described in detail hereinbelow, is an engine having external dimensions of 25 mm×16 mm×2 mm, and a having a combustion chamber having a volume of order 20 $mm^3$.

Such engines are expected to be useful in the propulsion of micro-air vehicles, and in the field of portable power supplies, since the energy density of the combustible fuels (such as hydrogen, or hydrocarbon fuels) on which the engines run, is significantly greater than that of state-of-the-art lithium-base batteries. Moreover, pulse jet engines according to the present invention are vastly simpler to fabricate than the gas turbine engines, pulse detonation engines, and ramjet engines proposed by Epstein. Unlike gas turbine engines, there are very few moving parts—at most there may be a valve, as is present in macro-scale pulse jet engines. However, in preferred embodiments, the engine is valveless, and has no moving parts. No pre-mixing of fuel with air is required—and thus there is no external carburettor, as required by the engines disclosed by WO2005/106234. Instead, fuel is injected directly into the engine from, for example, a fuel tank.

Conveniently, the combustion chamber is shaped to direct exhaust gases preferentially through the exhaust. By shaping the combustion chamber in this way, valves are not required at the air intake, since exhaust gases are automatically directed out of the exhaust. Advantageously, this simplifies construction and enhances reliability of the engine, since valves are complex to fabricate on such small scales, and are liable to be blocked by soot particles resulting from incomplete combustion of fuel. Moreover, by ensuring that exhaust gases are directed preferentially through the exhaust, it is ensured that the engine will develop thrust.

The exhaust, air intake and combustion chamber may be configured such that at least some exhaust gases are biased back toward the combustion chamber during a part of the combustion cycle. Exhaust gases, present in the exhaust after a previous combustion cycle, are at an elevated temperature in comparison to the rest of the engine. The return of some of the exhaust gases back into the combustion chamber therefore helps to increase the temperature within the combustion chamber, and aids re-ignition for the next cycle. Furthermore, the return of some of the exhaust gases also helps to compress the fuel/air mixture, thereby increasing the compression ratio for the engine, and therefore the combustion efficiency.

Such biasing is easily achieved, because of the reduced pressure that exists in the combustion chamber after the exhaust phase of the combustion cycle. As will be well understood by those skilled in the art, it is important to ensure that the proportion of exhaust gases entering the combustion chamber is kept relatively small in comparison to the amount of fuel and air. If the proportion is too high, the presence of exhaust gases within the combustion chamber will inhibit further combustion. In preferred embodiments, approximately 10% of the intake to the combustion chamber comprises exhaust gases.

Preferably, the engine is configured to self-resonate. Advantageously, a self-resonating engine does not require the precise timing cycles needed for a pulse detonation engine. This enables the design and construction of the pulse jet engine to be kept simple.

The engine may optionally be configured to cyclically combust at a frequency in the range between 8 kHz and 16 kHz. It has been found through experiment and simulation that embodiments of the present invention operate at such frequencies. The operating frequency is a result of the configuration of the engine; since engines according to the present invention are not restricted to operate at frequencies outside of the range of normal human hearing, simpler engine designs can be used.

Preferably, the engine further comprises ignition means to initialise self-resonance. Optionally, the ignition means comprise a heating element. The presence of ignition means simplifies the process of starting the engine.

Preferably, the combustion chamber, the air intake and the exhaust in combination are in a planar arrangement. Such an arrangement is advantageous in that it enables a much simplified construction process for engines according to the present invention. The combustion chamber, air intake, and exhaust are fabricated as so-called 2.5 dimensional structures. As will be understood by those skilled in the art, 2.5 dimensional structures do not have overhanging parts, and can be readily formed using techniques such as etching, which remove material from defined parts of a substrate. Engines according to the present invention are made by forming upper and lower component parts, each defining, respectively, an upper or lower half of the combustion chamber, the air intake, and the exhaust, by removal of material from a defined area of a substrate. Upper and lower parts are then joined together. Such a process is significantly simpler than, for example, the processes used to fabricate the engines disclosed by Epstein, and is possible because of the planar arrangement of the features of the engine.

Optionally, the fuel inlet terminates at an array of holes in a wall of the combustion chamber. The use of an array of holes at the fuel inlet better improves the mixing of the fuel with the air within the combustion chamber, and thus improves the combustion conditions. This is particularly important for millimeter-scale engines since the small scale of the combustion chamber results in largely laminar flow conditions. In contrast, in larger scale engines, turbulent flow conditions dominate, and mixing of fuel with air is achieved because of the turbulent flow. Mixing is not efficient under laminar flow conditions. The use of an array of holes at the fuel inlet enhances mixing through diffusion, by increasing the contact area between the in-flow of fuel from the fuel inlet, and the in-flow of air from the air intake, in the combustion chamber.

The fuel inlet may also comprise a fluidic valve configured to choke the flow of fuel through the fuel inlet during the combustion and exhaust phases of the combustion cycle. Such a fluidic valve does not comprise any moving parts, and so the engine is still "valveless" in the sense that no mechanical valves are present. It may consist of, for example, a configuration that prevents flow through the fuel inlet when pressure within the combustion chamber exceeds a threshold indicative of the combustion or exhaust phases of the combustion cycle. Preventing fuel inflow to the combustion chamber during the exhaust phase improves the efficiency of the engine, since fuel injected at this stage in the cycle would be expelled from the engine with the exhaust gases, and therefore wasted.

The engine may further comprise insulation means to retain heat within the engine. Efficient thermal management is essential to the successful operation of such a small engine. As the engine becomes smaller, the ratio of the surface area of the engine to the volume of the engine becomes greater. This results in more effective heat loss from the engine. In order for a combustion cycle to be maintained, the temperature within the combustion chamber must be sufficient for the fuel/air mixture to ignite. By providing the engine with insulation means, heat can be more effectively retained within the engine, and continued self-resonance is possible.

The insulation means optionally comprise channels enclosed within the engine body. Channels can be incorporated into the manufacturing process of the engine relatively easily. By providing channels near to the engine core, the dissipation of heat into the body of the engine can be reduced. Preferably, the insulation channels are evacuated, since this further improves their thermal insulation properties. Since bonding of the upper and lower components of the engine is likely to take place in a vacuum, it is straightforward to fabricate evacuated insulation channels. The insulation channels may be provided adjacent the exhaust. In this configuration, the channels act to prevent dissipation of heat from the exhaust gases, and thus exhaust gases returning to the combustion chamber exert an improved heating power, further aiding re-ignition. The insulation channels may be provided both adjacent the exhaust and adjacent the combustion chamber. Such an arrangement further improves the insulation provided by the channels, and, in particular, assists in maintaining the combustion chamber walls at an elevated temperature.

In one embodiment, the engine further comprises a duct to link the exhaust and the air intake; the combustion chamber comprises a first, intake opening, and a second, exhaust opening, and the first opening is provided with a surface shaped to entrain exhaust gases expelled through the first opening along the duct towards the exhaust. This represents one convenient way of enabling the engine to be valveless: the Coanda effect is used to direct exhaust gases through the exhaust, rather than back along the air intake.

The air intake may be provided with a ramp to direct air from the air intake into the first opening. The ramp thus prevents any substantial flow travelling directly from the air intake, along the duct linking the air intake to the exhaust, and out of the exhaust.

The first opening may be provided at the termination of a channel extending from the air intake to the combustion chamber, which channel directs exhaust gases expelled through the first opening towards the exhaust. Exhaust gases expelled through the first opening are thus directed towards the exhaust, rather than back through the air intake. The higher the proportion of exhaust gases expelled through the exhaust, the greater the thrust produced by the engine. Clearly, any exhaust gases expelled through the air intake will reduce the amount of thrust developed by the engine.

The exhaust may comprise primary and secondary exhausts, the primary exhaust extending from the duct, and the secondary exhaust extending directly from the second opening. It has been found, in the course of developing engines according to the present invention, that by dividing the exhaust into separate primary and secondary exhausts, an exhaust flow can advantageously be maintained through both openings in the combustion chamber. When both openings lead onto a single exhaust, it is possible that flow through one opening can choke the flow though the other.

The combustion chamber may comprise first and second openings, and the exhaust comprises first and second ducts; the first opening being in fluid communication with the first duct, and the second opening being in fluid communication with the second duct. As above, such an arrangement advantageously enables a flow of exhaust gases to be maintained, simultaneously, through both openings in the combustion chamber.

In an alternative embodiment, the air intake may comprise first and second air intake channels, the first and second air intake channels meeting at an opening to the combustion chamber, the opening facing in the direction of the exhaust. In such an embodiment, where the combustion chamber is provided with only one opening, the exhaust gases can be more easily directed towards the exhaust. Preferably, the exhaust comprises an exhaust duct shaped to entrain exhaust gases to follow the walls of the exhaust duct. The exhaust duct may expand in a direction moving away from the combustion chamber.

The invention extends to air vehicles comprising engines as described above, and to power sources comprising engines as described above. In this connection, it is noted that the invention is expected to find utility as a propulsion means for unmanned air vehicles (UAVs), or as a heat source for portable power generation.

BRIEF DESCRIPTION OF THE DRAWINGS

The above and further features of the invention are set forth in the appended claims and will be explained in the following with reference to various exemplary embodiments which are illustrated in the accompanying drawings in which:

FIGS. 1a and 1b are plan views of a cross-section through an engine in accordance with a first embodiment of the invention, illustrating two stages in the combustion cycle of the engine;

FIGS. 2a and 2b illustrate fluid flows through the engine illustrated in FIG. 1;

FIG. 3 is a photograph of a number of components of the engine illustrated in FIG. 1;

FIG. 5 is a plan view of a cross-section through an engine in accordance with a second embodiment of the invention;

FIGS. 6a and 6b illustrate fluid flows through the engine illustrated in FIG. 5; and FIGS. 7a and 7b are plan views of a cross-section through an engine in accordance with a third embodiment of the invention.

Figure 4A:
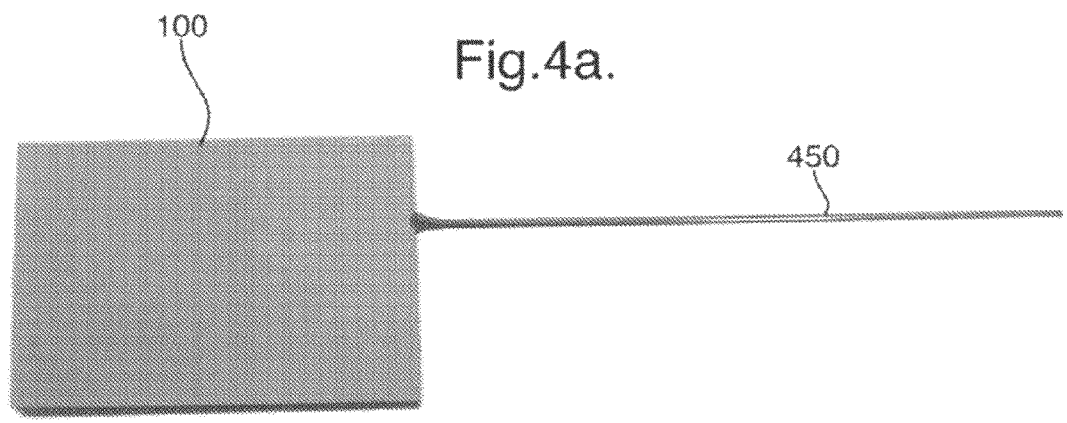
FIGS. 4a and 4b are photographs of the first embodiment of the invention.

In the following description, it is to be remembered that the described embodiments of the present invention share a common approximate size of $20 \times 20 \times 2$ mm$^3$. Whilst these dimensions may, of course, vary for each specific embodiment, it is noted that engines of such scale are inherently different to macro-scale pulsejet engines, the designs of which have been adapted for use at these scales. A number of specific differences are identified and explained below.

Firstly, the frequency of operation of the micro-scale pulse jet engines described hereinafter is of order 8-16 kHz, significantly higher than that of conventional macroscale pulse jet engines. This means that the residence time of the fuel/air mixture in the engine's combustion chamber may become comparable to the chemical time for the combustion reaction to occur. It is therefore important to maintain a high temperature in the combustion chamber, and, in particular, to keep the walls of the combustion chamber as hot as possible, since the rate of the chemical reaction will increase with increasing temperature. Thus the chemical time for the combustion reaction to occur will decrease as the temperature of the combustion chamber increases.

Secondly, the minor dimension of the combustion chamber may become comparable to the quenching distance of a flame front. Again, therefore, it is essential to keep the walls of the combustion chamber, and the gases within the combustion chamber, as hot as possible, since this will increase the rate of the chemical reaction, and reduce the quenching distance. However, as the engines decrease in size, the surface-area to volume ratio increases, and the engine will dissipate heat more readily. Thus thermal management systems are important in small-scale engines. Moreover, it is important to use materials that are able to withstand the necessary high temperatures. Embodiments of the present invention are thus fabricated from, for example, silicon, silicon carbide or silicon nitride.

Thirdly, the small scale of the engines affects the flow conditions within the engine. At very small scale, laminar flow dominates, whilst at larger scales, turbulent flow dominates. In the turbulent flow regime, mixing between fuel and air is achieved through the turbulent mixing. This regime dominates in macro-scale pulse jet engines. Calculations have shown that millimeter-scale engines in accordance with embodiments of the present invention are likely to exhibit flows that are transitional between the laminar and turbulent regime. Given this, and the fact that the residence time of the fuel/air mixture in the combustion chamber is, for millimeter-scale engines, short, it advantageous to include means to enhance mixing between fuel and air within the combustion chamber so as to improve the efficiency of combustion.

All of the engines described below comprise a fuel inlet operable to inject fuel directly into a combustion chamber, in contrast to macro-scale pulsejet engines in which the fuel and air are taken in through a common intake. The fuel inlets are square-showerhead arrangements of thirty-six 20 μm diameter holes in the combustion chamber floor. The holes are on a 40 μm pitch, and lead into a duct through the body of the engine that can be connected to an external fuel supply, such as a pressurised fuel tank. Locating the fuel inlet within the combustion chamber ensures reliable delivery of fuel. Moreover, the showerhead arrangement of the fuel inlet increases the contact area between fuel and air in the combustion chamber, and thus enhances diffusive mixing. This mitigates the reduced mixing efficiency resulting from limited turbulence in the combustion chamber. The use of a pressurised fuel supply will also help to enhance the mixing efficiency.

In some embodiments, electrospray means are incorporated into the fuel inlet in order to reduce the size of fuel droplets. Reducing the droplet size is particularly desirable where more complex hydrocarbon fuels are to be used in the engine (such as diesel, or JP8 jet fuel). A reduction in the droplet size increases the interfacial area between the fuel and air, resulting in an increase in combustion efficiency. Electrosprays are known for such use in combustors: see, for example, the paper "Mesoscale Power Generation by a Catalytic Combustor using Electrosprayed Liquid Hydrocarbons," by Kyritsis, D. C., Guerrero-Arias, I., Roychoudhury, S. and Gomez, A., Publisher in Proceedings of the Twenty-Ninth Symposium (International) on Combustion, 2002, at page 965. Electrosprays function by imparting an electric charge to a liquid flowing within a capillary. Coulombic repulsion then atomizes the liquid, resulting in droplet sizes that can be of order 1 µm. As those skilled in the art will appreciate, electrosprays can be readily adapted so as to be integral with the fuel inlet of the pulse jet engines described herein.

Ignition devices, comprising heating elements 4 of dimension 100 µm by 10 µm are also common to the embodiments described below, and are located in the combustion chamber. These ignition devices are used to start the resonant combustion process.

FIG. 1 shows an engine 100 in accordance with a first embodiment of the invention. Engine 100 comprises a body 110, a combustion chamber 120, air intake channels 142 and 144, and exhaust 160. Air intake channels 142 and 144 are defined by the body 110 of the engine and the walls 124 of the combustion chamber 120. Channels 142 and 144 define paths from the left of engine 100 (as shown) that meet at the mouth 122 of the combustion chamber 120 after travelling round opposite sides of combustion chamber 120. Air intake channels 142 and 144 also meet with the tip of exhaust 160 at mouth 122. Exhaust 160 is nozzle-shaped, and expands in a direction moving away from the mouth 122 of the combustion chamber 120.

Body 110 is provided with insulation channels 114 and 116 running along the side of the exhaust 160. These channels 114, 116 form enclosed spaces in engine 100 that may either be evacuated or air-filled and serve to insulate exhaust 160. This ensures that the walls of the exhaust 160 maintain an elevated temperature during operation of engine 100. Since engine 100 is small—once constructed, it is of dimensions $25 \times 16 \times 2$ $mm^3$—it has a high surface-area to volume ratio, and therefore is likely to lose heat rapidly. Ignition of a fuel/air mixture in the combustion chamber during operation relies on the temperature inside engine 100 remaining at an elevated temperature after previous combustion cycles, with only initiation requiring an additional ignition system. Insulation channels 114 and 116 help to maintain the elevated temperature. Air intake channels 142 and 144 also provide some insulation to combustion chamber 120. Furthermore, engine 100 can be encased within an insulating material (not shown), such as Aerogel, in order to maintain an elevated temperature during its operation.

Arrows 151 and 152, in FIG. 1a, indicate fluid flows around the engine 100 during the intake phase of the combustion cycle. Engine 100, in operation, produces thrust along the axis of the nozzle-shaped exhaust, opposite to the direction of the nozzle expansion—i.e. in a horizontal line from right to left in FIG. 1a. During the intake phase, there exists a reduced pressure in combustion chamber 120 that draws air through air intake channels 142 and 144 into the combustion chamber through mouth 122. Air drawn in through channel 142 moves initially opposite to the thrust direction, before being drawn round the outside of the walls 124 of the combustion chamber and then through combustion chamber mouth 122, along the thrust direction. Hot exhaust gases, left over from the previous combustion cycle, are drawn into the combustion chamber from exhaust 160. Fuel is injected directly into the combustion chamber from a fuel inlet such as for example, a fluidic valve 5, located near the combustion chamber mouth 122. Once a sufficient pressure of the fuel/air mixture is reached inside the combustion chamber, ignition occurs, as indicated by circle 154 in FIG. 1b, due to the elevated temperature of the exhaust gases drawn into the combustion chamber 120 in the intake phase, and the elevated temperature of the walls of the combustion chamber 120 resulting from previous combustion cycles. Continued combustion results in the production of exhaust gases. These exhaust gases are then forced out of the exhaust 160, as indicated by arrow 153 in FIG. 1b, by the increased pressure in the combustion chamber developed as a result of the combustion process.

As is indicated by arrow 153 in FIG. 1b, the exhaust gases are preferentially directed through the exhaust 160 rather than back through air intake channels 142 and 144. This results from the arrangement of the exhaust 160, combustion chamber mouth 122 and air intake channels 142 and 144. Combustion chamber mouth 122 is slightly elongate in the thrust direction, thus forming a short duct projecting into combustion chamber 120 along the thrust direction. Furthermore, air intake channels 142 and 144 run in a direction at right angles to the duct formed by the combustion chamber mouth, and the corners at the exit from the duct at its exhaust end are sharp, so that fluid exiting combustion chamber 120 through mouth 122 is unlikely to flow back along the air intake channels. These factors in combination promote the formation of an exhaust gas 'jet' directed out of the combustion chamber, as indicated by arrow 153.

Fluid flow in the intake and exhaust phases is shown in more detail in FIGS. 2a and 2b. The diagrams represent output from computational fluid dynamics software. Only half of the plan of engine 100 is shown, since it exhibits a mirror symmetry along a centre line parallel to the thrust direction. Parts of engine 100 are labelled in FIGS. 2a and 2b using the same reference numerals as used in FIGS. 1a and 1b, and are not described further. FIG. 2a illustrates flows during the intake phase, and shows that gases enter the combustion chamber 120 from both the exhaust 160 and the air intake channel 142 (these flows are indicated generally at 202, 204 respectively). In fact, calculations show that approximately 50% of the total mass flow into the combustion chamber during the intake phase enters from the intake channels, with the remaining 50% entering through the exhaust. These calculations assume laminar flow around the engine, whilst, in fact, there is expected to be some significant turbulent component to the flow. However, it is clear that the engine 100 could be improved by increasing the proportion of in-flow to the combustion chamber from the air-intake channels 142, 144. If there is too great a concentration of exhaust gases in combustion chamber 120, combustion will not be possible, since there will not be a sufficient quantity of fuel or air.

FIG. 2b illustrates fluid flows in the engine 100 during the exhaust phase. As shown, a jet of fluid, indicated generally at 206, exits the combustion chamber and leaves the engine through exhaust 160, without expanding with the exhaust nozzle. It is noted again that the calculations performed to give these results assume laminar flows in the engine 100. In the exhaust phase, a significant turbulent component to the flow is expected to lead to some degree of attachment of the exhaust 'jet' to the walls of the exhaust. However, laminar flow calculations indicate that 100% of the mass flow out of the combustion chamber during the exhaust phase leaves through the exhaust 160.

FIG. 3 is a photograph of four identical component parts 300 of engine 100. The component parts 300 are etched into a single silicon wafer. In order to fabricate an engine 100, two such parts are securely bonded together, one on top of the other. As is seen from FIG. 3, structures 300 are 2.5D structures—that is, they can be defined by projection onto a plane. Structures 300 are clearly not two-dimensional, having some depth, but they do not have any overhanging parts. In addition to this, the features machined into structures 300 (e.g. the combustion chamber at 320, and the exhaust at 360), are of uniform depth, with the single exception of the fuel inlet—which is not clearly visible in FIG. 3. This property makes manufacturing of components 300 remarkably straightforward. In fact, FIG. 3 illustrates four such components etched onto one silicon wafer 350. Production could be readily scaled up. Each component 300 is of dimensions 16 mm×25 mm, and for 350 is 1 mm thick. Etched features are 800 μm deep, so that, once the complete engine is constructed by fastening two such components 300 together, the resulting combustion chamber depth is 1.6 mm. It is noted that this dimension is over double the quenching distance for hydrogen under stoichiometric conditions (0.64 mm), and thus that problems associated with flame-front quenching should be avoided when hydrogen is used as a fuel. The total combustion chamber volume is of order 20 $mm^3$.

Figure 4B:
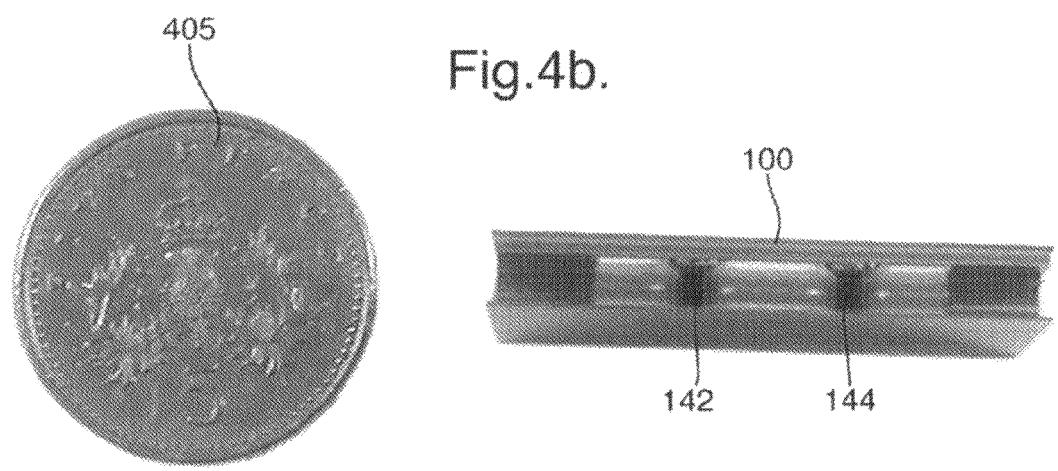

Photographs of the engine 100 of the first embodiment of the invention are shown in FIGS. 4a and 4b. FIG. 4a is a photograph of the engine 100 taken from above, and shows fuel line 450 (made from KOVAR) attached to the engine. Fuel line 450 supplies fuel to the combustion chamber, via the showerhead fuel inlets in the combustion chamber. FIG. 4b is a photograph of the engine 100 taken from the side, and shows air intake channels 142 and 144. Also shown in FIG. 4b is a coin 405 (an English five-pence coin) included in the photograph in order to indicate the approximate scale of the engine 100. Coin 405 is approximately 18 mm in diameter.

FIG. 5 illustrates an engine 500 according to a second embodiment of the present invention. Engine 500 comprises two combustion chambers 520 and 530, air intake 540, and exhaust 560. Duct 580 runs in between combustion chambers 520 and 530, along a centre-line of the engine 500, and links air intake 540 with exhaust 560. Channels 522 and 532 link duct 580 to combustion chambers 520 and 530 respectively, and also to air intake 540. The combustion chambers 520 and 530 are separated from channels 522 and 532, and from duct 580, by walls 524 and 534. A ramp 590 is provided at the junction between air intake 540, channels 522 and 532, and duct 580. Ramp 590, in combination with the shape of the combustion chamber walls 524 and 534, is intended to direct fluid flows appropriately at this junction, such that air taken into the engine through air intake 540 is directed preferentially into combustion chambers 520 and 530, rather than along duct 580, and such that exhaust gases exiting through channels 522 and 532 are directed preferentially through duct 580, rather than back through air intake 540. A second exit is provided in each combustion chamber 520 and 530 through which exhaust gases can also escape. These exits, referenced 526 and 536 in FIG. 5, lead directly from the combustion chambers into exhaust 560. As with engine 100, enclosed insulation channels 514, 516 are provided in the engine body 510 in order to retain heat within the engine 500, so as to aid re-ignition in successive combustion cycles. In engine 500, however, channels 514 and 516 extend along exhaust 560, around combustion chambers 520, 530, and along intake 540. The insulating channels thus also aid the maintenance of an elevated wall temperature for the combustion chamber. Again, as with engine 100, engine 500 may be embedded in thermally insulating material, such as Aerogel, in order to improve heat retention in the engine.

The combustion cycle in engine 500 will now be described. During the combustion phase, exhaust gases are produced in the combustion chambers 520 and 530 by the combustion of air with fuel. Combustion results in heating and an increased pressure within the combustion chambers 520, 530. Exhaust gases are thus expelled from combustion chambers 520 and 530 through exits 526 and 536, and through channels 522 and 532. Gases expelled through exits 526 and 536 flow directly into the exhaust 560 and thus exit the engine. Gases expelled through channels 522 and 532 are entrained to follow walls 524 and 534 through the Coanda effect, and then flow, via duct 580, to exhaust 560, and then out of engine 500. Appropriate shaping of the walls 524 and 534 is therefore necessary.

Over-expansion within the combustion chambers 520 and 530 reduces pressure in the combustion chamber, and thus pulls a mixture of air and exhaust gases into the combustion chambers 520 and 530. Exhaust gases may re-enter the combustion chambers through either exits 526, 536, or through channels 522, 532. Air flowing through the air in-take 540 is split into two paths, which lead through channels 522, 532 into the combustion chambers 520, 530 by ramp 590. Air and exhaust gases entering the combustion chambers 520 and 530 cause the pressure to increase until the mixture ignites with fuel within the combustion chambers 520 and 530.

Fluid flows through the engine 500 during the intake and exhaust phases of the combustion cycle are illustrated in FIGS. 6a and 6b. These figures are analogous to FIGS. 2a and 2b: they represent results obtained from calculations performed using computational fluid dynamics software. As in FIGS. 2a and 2b, only one half of engine 500 is shown in FIGS. 6a and 6b; the same numerals used in FIG. 5 are used to refer to parts of the engine also shown in FIGS. 6a and 6b. FIG. 6a shows fluid flows during the intake phase of the combustion cycle for engine 500. As shown in FIG. 6a, intake into the combustion chamber consists of both exhaust gases (in the flow indicated at 604) and air (in the flow indicated at 602) from the intake. For engine 500, exhaust gases enter combustion chamber 520 through exit 526 and through channel 522, via duct 580. Air from intake 540 also enters combustion chamber 520 through channel 522. Calculations show that, during the intake phase of the combustion cycle for engine 500, 68% of the in-flow is through the intake 540.

FIG. 6b illustrates fluid flows around engine 500 during the exhaust phase of the combustion cycle. Two distinct fluid flow paths to exhaust 560 are present: one, indicated at 606, through exit 526, directly into exhaust 560; and one, indicated at 610, 614 through channel 522 and duct 580. The part 614 of the flow 610 through channel 522 is entrained by the wall 524 of the combustion chamber, due to the Coanda effect, and exits through exhaust 560, whilst a part 612 is separated from the main flow 610 by ramp 519 and exits engine 500 through air intake 540. Calculations show that, during the exhaust phase, only 49% of the outflow exits engine 500 through the exhaust 560. 51% of the outflow exits through air intake 540.

Thus, during the intake phase, 68% of the inflow is through the intake; and during the exhaust phase, 49% of the outflow is through the exhaust. It is noted that these figures are likely to be subject to a degree of error, but it is clear that the design of engine 500 could be improved. In a good engine design, 90% of the inflow would be through the intake, and 100% of the outflow would be through the exhaust. A degree of intake of exhaust gases is desirable because the elevated temperature of the exhaust gases heats incoming fuel and air, aiding re-ignition within the combustion chamber. However, if a large proportion of the intake comprises exhaust gases, it is unlikely that combustion will occur at all. It is important, however, that the outflow is directed mostly, or entirely, through the exhaust, since this maximises the thrust produced by the engine.

FIG. 7a shows, schematically, an engine 700 that is an improved version of engine 500 described above. Engine 700 is functionally similar to engine 500, and like parts are therefore referenced by the same numerals as corresponding parts of engine 500, incremented by two hundred. The combustion cycle for engine 700 is the same as that for engine 500, and will not be described further. It is noted also that insulation channels, similar to channels 514 and 516 of engine 500, will also be present in engine 700, but that these are now shown in FIG. 7 for reasons of clarity. The main differences between engine 700 and engine 500 are the shape of the combustion chambers 720, 750, the position of the ramp 790, and the splitting of the exhaust 760 into separate exhaust ducts 762 and 764. These modifications result in significantly enhanced performance. During the intake phase for engine 700, 92% of the inflow is through the intake; and during the exhaust phase, 79% of the outflow is through the exhaust. The effects of the individual modifications are described in turn below.

The position of the ramp 790 is slightly "downstream" of that of ramp 590 of engine 500, closer to the exhaust and of the engine. Simulations of flow through engine 500 demonstrate that ramp 590 does not adequately perform its function of directing inflow into channels 522, 532. In engine 700, ramp 790 is positioned close to the inlets to channels 722, 732. In particular, the corners 792, 793 of ramp 790, at which the flow separates from the surface of the ramp, are positioned close to these inlets. This repositioning improves the proportion of gas flow from the intake 740 travelling into combustion chambers 720, 730.

A number of aspects of the shape of combustion chambers 720, 730 of engine 700 are modified in comparison to combustion chambers 520, 530 of engine 500. The outer walls of the combustion chambers 720, 730 are more smoothly curved. It was found by simulation that this improves the degree of entrainment of gas flow exiting combustion chambers 720, 730 to walls 724, 734. This increases the proportion of exhaust gas flowing through the exhaust 760, and decreases the proportion of exhaust gases flowing out of the intake 740. Channels 722, 732 have also been made nozzle-shaped. This increases the mass flow from the intake 740 into the combustion chambers 720, 730 during the intake phase. In addition, channels 722 and 732 narrow towards duct 780, so that flow leaving combustion chambers 720 and 730 is accelerated along channels 722 and 732. This encourages the flow to leave the Coanda surfaces (formed by walls 724, 734) in the form of a jet directed towards duct 780. Furthermore, at the junction of channels 722, 732 with intake 740 and duct 780, channels 722 and 732 are directed slightly towards the exhaust 760, such that flows leaving combustion chambers 720 and 730 are preferentially directed towards exhaust 760, rather than into air intake 740.

The exhaust 760 of engine 700 is split into three separate ducts 762, 764 and 766. Duct 762 is an extension of duct 780 that links intake 740 with exhaust 760. Ducts 764 and 766 extend from exits 726 and 736 from combustion chambers 720, 730. Simulation work showed that this enhanced the amount of mass flow through duct 780. This is because, without the separate ducts—as in engine 500, for example— flow from exits 526, 536 expands to fill the entire exhaust, thereby blocking flow from duct 580. By splitting the exhaust, as with exhaust 760, this problem is avoided, since flows through duct 780 and exits 726 and 736 are kept separate.

Figure 7B:
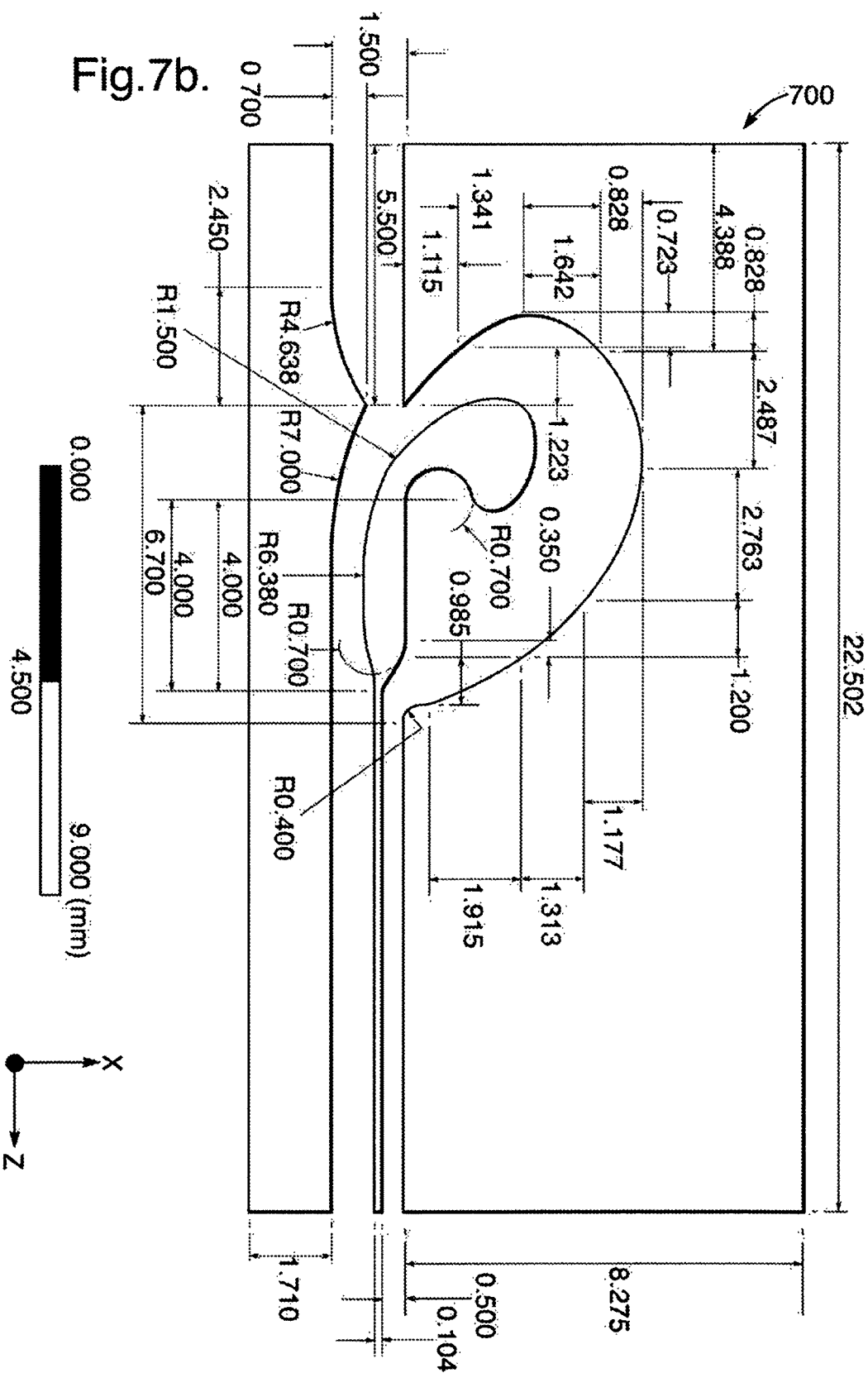

The dimensions of the various component parts of the third embodiment of the invention are shown in FIG. 7b, which is a plan view of a cross section through one half of the third embodiment, as will be clear from the similarities between FIGS. 7a and 7b. For the purpose of clarity, reference numerals are not included in FIG. 7b, as the features and components of the third embodiment are labelled with reference numerals in FIG. 7a. Instead, the dimensions (in mm) of the engine 700 are given in FIG. 7b. Numbers preceded by "R" are radii of curvature. Those curves without radii of curvature indicated are spline curves, fitted to the points as indicated. Engine 700 is one of a number of engines modelled, using computational fluid dynamics techniques, to determine flow patterns within a millimeter-scale engine. Of the designs tested in this way, engine 700 was found to exhibit the best performance.

Fabrication of all of the above embodiments is carried out using known micro-machining technology such as milling, laser drilling or etching. In particular, reactive ion etching, deep reactive ion etching, or electro-discharge machining can be used to make components such as components 300 illustrated in FIG. 3. As shown in FIG. 3, a number of such components may be formed on one wafer. Laser drilling or etching techniques can be used to make holes forming the fuel inlet in the combustion chamber. Bonding of two components together, using either fusion bonding, reaction bonding, or the pyrolysis of pre-ceramic polymers—such as Ceraset®, from KiON Corporation—then produces the engine core. Fuel pipes, fabricated from, for example, KOVAR, are then fitted, and the engine appropriately insulated, if necessary, in Aerogel or some other appropriate insulating material as described above.

The above embodiments are fabricated from materials able to withstand the high temperatures generated by the combustion process, and the increased pressures generated during combustion. In particular, silicon and silicon carbide can be used to fabricate engines according to embodiments of the invention. Both silicon and silicon carbide can be machined using the known techniques described above. It may be possible to fabricate the bulk of the engine from silicon, and then carborise the surfaces of the component parts of the engine to produce a silicon structure lined with silicon carbide. Alternatively, it may be possible to fabricate embodiments of the invention from any refractory ceramic.

Embodiments of the present invention may be used for the propulsion of micro air-vehicles or UAVs, or as compact power sources. Power can be extracted from the exhaust jet—which comprises both thermal and kinetic energy—or from the engine core itself—by attaching thermocouples appropriately. Alternatively, it may be possible to use a gas turbine to extract kinetic energy from the exhaust jet—although, notably, this would require the incorporation of moving parts into the power source system.

Various equivalents and modifications to the above-described embodiments, that will be obvious to those skilled in the art, are possible without departing from the scope of the invention, which is defined in the accompanying claims. For example, whilst it has been described above to use a heating element in the combustion chamber to aid ignition, other suitable ignition aids will be immediately obvious to those skilled in the art. It will be obvious to those skilled in the art that, for example, a spark plug, or catalytic ignition means, could be incorporated into the combustion chamber in order to aid ignition. Platinum is one known catalyst that can be used to catalyse the combustion of hydrogen. Other catalysts, known to those skilled in the art, may be appropriate for other hydrocarbon fuels that may be used in conjunction with engines according to the present invention.

It is to be understood that further embodiments, in addition to the above-described exemplary embodiments, are envisaged. It is also to be clearly understood that any feature described above in relation to any one embodiment may be used alone, or in combination with other features described, and may also be used in combination with one or more features of any other of the embodiments, or any combination of any other of the embodiments.

The invention claimed is:

1. A millimeter-scale pulse jet engine, comprising: an engine body having dimensions from 0.001 mm to 10 mm;
a combustion chamber;
a fuel inlet arranged to inject fuel directly into the combustion chamber;
an air intake; and
an exhaust, wherein a portion of the air intake proximal a mouth of the combustion chamber is arranged at substantially 90° with respect to the mouth of the combustion chamber,
wherein the air intake and the exhaust are in fluid communication with the combustion chamber so that the air intake delivers flow into the mouth of the combustion chamber and the exhaust receives flow from the mouth of the combustion chamber; and the combustion chamber is configured such that air from the air intake and fuel from the fuel inlet cyclically combust in the combustion chamber to produce exhaust gases wherein the combustion chamber is shaped for directing exhaust gases through the exhaust and wherein the exhaust, air intake and combustion chamber are configured such that at least some exhaust gases are biased back toward the combustion chamber during a part of the combustion cycle;
wherein the at least some of the exhaust gases are at an elevated temperature and heat fuel from the fuel inlet and air from the air intake so as to provide re-ignition within the combustion chamber in the next combustion cycle.

2. An engine as claimed in claim 1, configured to self-resonate.

3. An engine as claimed in claim 2, configured to cyclically combust at a frequency in the range between 8 kHz and 16 kHz.

4. An engine as claimed in claim 1, further comprising ignition means to initialise self-resonation.

5. An engine as claimed in claim 4, wherein the ignition means comprise a heating element.

6. An engine as claimed in claim 1, wherein the combustion chamber, the air intake and the exhaust in combination are in a planar arrangement.

7. An engine as claimed in claim 1, wherein the fuel inlet terminates at an array of holes in a wall of the combustion chamber.

8. An engine as claimed in claim 7, wherein the fuel inlet comprises a fluidic valve configured to choke the flow of fuel through the fuel inlet during the combustion and exhaust phases of the combustion cycle.

9. An engine as claimed in claim 1, further comprising insulation means to retain heat within the engine.

10. An engine as claimed in claim 9 wherein the insulation means comprise channels enclosed within the engine body.

11. An engine as claimed in claim 10 wherein the insulation channels are evacuated.

12. An engine as claimed in claim 10 wherein the insulation channels are provided adjacent the exhaust.

13. An engine as claimed in claim 1, wherein the air intake comprises first and second air intake channels, the first and second air intake channels meeting at an opening to the combustion chamber, the opening facing in the direction of the exhaust.

14. An engine as claimed in claim 13, wherein the exhaust comprises an exhaust duct shaped to entrain exhaust gases to follow the walls of the exhaust duct.

15. An engine as claimed in claim 14, wherein the exhaust duct expands in a direction moving away from the combustion chamber.

16. An engine as claimed in claim 1 wherein the engine is valveless.

17. An air vehicle comprising an engine as claimed in claim 1.

18. A power source comprising an engine as claimed in claim 1.

19. A millimeter-scale pulse jet engine, comprising:
an engine body having dimensions from 0.001 mm to 10 mm;
a combustion chamber;
a fuel inlet arranged to inject fuel directly into the combustion chamber;
an air intake; and
an exhaust, wherein the air intake and the exhaust are in fluid communication with the combustion chamber; and the combustion chamber is configured such that air from the air intake and fuel from the fuel inlet cyclically combust in the combustion chamber to produce exhaust gases wherein the combustion chamber is shaped for directing exhaust gases through the exhaust and wherein the exhaust, air intake and combustion chamber are configured such that at least some exhaust gases are biased back toward the combustion chamber during a part of the combustion cycle;
a duct to link the exhaust and the intake wherein the combustion chamber comprises a first opening for intake, and a second opening for exhaust, the first opening being provided with a surface shaped to entrain exhaust gases expelled through the first opening along the duct towards the engine exhaust; and
wherein the exhaust comprises primary and secondary exhausts, the primary exhaust extending from the duct, and the secondary exhaust extending directly from the second opening;
wherein the at least some of the exhaust gases are at an elevated temperature and heat fuel from the fuel inlet and air from the air intake so as to provide re-ignition within the combustion chamber in the next combustion cycle.

20. An engine as claimed in claim 19, wherein the air intake is provided with a ramp to direct air from the air intake into the first opening.

21. An engine as claimed in claim 19, wherein the first opening is provided at the termination of a channel extending from the air intake to the combustion chamber, wherein the channel directs exhaust gases expelled through the first opening towards the exhaust.

22. An engine as claimed in claim 19; wherein insulation channels are provided both adjacent the exhaust and adjacent the combustion chamber.

23. A millimeter-scale pulse jet engine, comprising:
an engine body having dimensions from 0.001 mm to 10 mm;
a combustion chamber;
a fuel inlet arranged to inject fuel directly into the combustion chamber;
an air intake; and
an exhaust, wherein the air intake and the exhaust are in fluid communication with the combustion chamber; and the combustion chamber is configured such that air from the air intake and fuel from the fuel inlet cyclically combust in the combustion chamber to produce exhaust gases wherein the combustion chamber is shaped for directing exhaust gases through the exhaust and wherein the exhaust, air intake and combustion chamber are configured such that at least some exhaust gases are biased back toward the combustion chamber during a part of the combustion cycle; and wherein the combustion chamber comprises first and second openings, and the exhaust comprises first and second ducts; the first opening being in fluid communication with the first duct, and the second opening being in fluid communication with the second duct;

wherein the at least some of the exhaust gases are at an elevated temperature and heat fuel from the fuel inlet and air from the air intake so as to provide re-ignition within the combustion chamber in the next combustion cycle.

* * * * *